UNITED STATES PATENT OFFICE 2,273,424

PREPARATION OF 2-MERCAPTO-THIAZOLINES

Bernard M. Sturgis, Pitman, N. J., and John J. Verbanc, Wilmington, Del., assignors to E. I. du Pont de Nemours & Company, Wilmington, Del., a corporation of Delaware No Drawing. Application July 7, 1939,
Serial No. 283,183

9 Claims. (Cl. 260—302)

This invention relates to the preparation of 2-mercapto-thiazolines and more particularly to 2-mercapto-thiazolines containing aliphatic substituents in one or both of the 4 and 5 positions.

2-mercapto-thiazoline has the formula

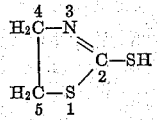

This compound has been found to be an excellent accelerator for the vulcanization of rubber. Also, the homologs and other substituted compounds containing aliphatic substituents in one or both of the 4 and 5 positions have been found to be excellent accelerators for the vulcanization of rubber. 2-mercapto-thiazoline and some of its homologs are known. 2-mercapto-thiazoline has been prepared by reacting ethanol amine with carbon disulfide in a solvent and in the presence of alkali under reflux. When it has been attempted to prepare the homologous 2-mercapto-thiazolines from the higher amino alcohols of three or more carbon atoms by the same procedure, the process has failed, producing only oxazolines. Accordingly, when the homologous 2-mercapto-thiazolines have been prepared heretofore, other and more expensive procedures have necessarily been followed.

It is an object of our invention to provide a method for the preparation of 2-mercapto-thiazolines from orthomonoamino aliphatic alcohols of 3 or more carbon atoms. Another object is to provide a method for reacting carbon disulfide with an ortho-monoamino aliphatic alcohol of at least 3 carbon atoms so as to produce mercapto-thiazolines having aliphatic substituents in at least one of the 4 and 5 positions. A further object is to provide a method for producing 2-mercapto-thiazolines containing aliphatic substituents in at least one of the 4 or 5 positions in good yields and in a high state of purity. A still further object is to advance the art. Other objects will appear hereinafter.

The above and other objects of our invention may be accomplished by reacting an ortho-monoamino aliphatic alcohol of at least 3 carbon atoms with carbon disulfide in a closed vessel under pressure and at temperatures in excess of 120° C. We have found that, under such conditions, good yields of the corresponding 2-mercapto-thiazolines are formed with the production of very little or no oxazoline in the final product. We found it to be necessary to employ temperatures of at least 120° C., as at lower temperatures either mercapto-oxazolines or mixtures of mercapto-oxalines and mercapto-thiazolines are produced, which mixtures are very difficult to separate. Temperatures up to 200° C. or higher may be employed. However, we have found that the best results are obtained at temperatures of from about 130° C. to about 170° C.

Due to the volatility of the reacting ingredients and particularly of the carbon disulfide, it is necessary to carry out the reaction in a closed pressure vessel. The pressures employed will generally be those caused by the reacting ingredients, the reaction products and the atmosphere in the vessel under the conditions employed. Higher pressures may be employed if desired and these may be obtained by introducing an inert gas, such as hydrogen sulfide, nitrogen and the like, into the vessel under pressure. We have found that the 2-mercapto-thiazolines produced are more stable under the elevated pressures and particularly the pressure of hydrogen sulfide than at atmospheric pressures at the same temperatures.

While any ortho-monoamino aliphatic alcohol of 3 or more carbon atoms may be reacted with carbon disulfide in accordance with our invention, we preferably employ those ortho-monoamino aliphatic alcohols which are otherwise free of strongly acidic and strongly basic substituents, and particularly the ortho-monoamino alkanols, as better results are obtained thereby. Preferably we employ the ortho-monoamino alkanols of from 3 to 8 carbon atoms. However, within the broad aspect of our invention, the amino alcohols may contain halogen, hydroxy, ester, ether, cyano and like substituents. The 2-amino-1-alkanols which form the mercapto-thiazolines containing alkyl substituents in the 4 position produce the most desirable compounds.

By the term "ortho-monoamino aliphatic alcohol," we mean the strictly aliphatic alcohols which contain no aromatic groups and in which the single amino group is directly bonded to a carbon atom adjacent to the carbon atom carrying a hydroxy group. By the term "amino," we intend to include only the radical —$NH_2$. When we call for an amino aliphatic alcohol "otherwise free of strongly acidic and strongly basic substituents," we mean to exclude compounds containing basic substituents other than the single primary amino radical and to exclude compounds containing free acidic groups other than or more strongly acidic than the hydroxyl group. By the term "amino alkanol," we mean to include only those amino alcohols which, except for the single amino radical and the hydroxyl groups, consist of carbon and hydrogen and contain no aromatic ring.

Amongst the amino alcohols which we have found to be particularly desirable are:

2-amino-2-methyl-propanol

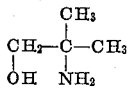

2-amino-1-butanol

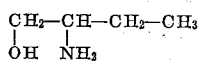

2-amino-1-propanol

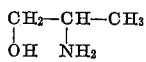

2-amino-2-methyl-1-butanol

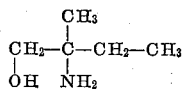

2-amino-1-pentanol

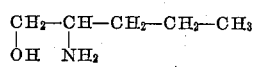

3-amino-3-methyl-2-butanol

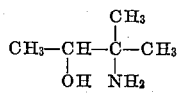

1-amino-2-methyl-propanol-2

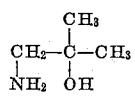

2-amino-2-methyl-1,3-propanediol

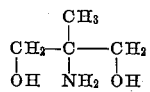

The amount of carbon disulfide employed can be varied over a wide range. It will generally be impracticable to employ less than 1 mole of carbon disulfide for each mole of amino alcohol. The best yields will be obtained when at least 2 moles of carbon disulfide are employed for each mole of amino alcohol. The process is most economically carried out when the proportion of carbon disulfide amounts to from about 2 to about 3 moles for each mole of amino alcohol. The whole of the carbon disulfide can be added to the amino alcohol at the start, or it may be added in two or more parts, or gradually during the course of the reaction.

The reaction may be carried out either in the presence or in the absence of a solvent. However, we have found that the best results are obtained when a solvent is employed, and particularly when the solvent is a hydroxylated solvent such as water and the alcohols. The best results are obtained when water is employed as the solvent. However, other inert solvents may be employed such as methanol, ethanol, benzene, xylene, chlorobenzene, gasoline, acetone, carbon tetrachloride and the like. Generally, the best results are obtained when the solvent is one in which the reagents are reasonably soluble at the reaction temperature. Mixtures of solvents may be employed as desired.

The reaction may be caused to take place either in the presence or in the absence of substances more basic than the amino alcohol. However, the best results are obtained when the reaction is carried out in the presence of strongly basic materials such as the alkali metal hydroxides, the alkaline earth hydroxides, the alkali metal carbonates, the alkaline earth carbonates, ammonia and the like. These strongly basic materials are particularly desirable when a hydroxylated solvent is employed.

The preferred method of our invention comprises heating an ortho-monoamino alkanol with from about 2 to about 3 moles of carbon disulfide in a closed vessel under the pressures naturally generated therein and at temperatures of from about 130° C. to about 170° C. in the presence of a hydroxylated solvent, particularly water, and in the presence of an alkali metal hydroxide. The products of the reaction may be purified by crystallization from water, alcohol, benzene or other suitable solvent, or by dissolving them in an alkaline solution and precipitating with an acid.

In order to illustrate our invention more clearly, the preferred modes of carrying the same into effect and the advantageous results to be obtained thereby, the following examples are given:

*Example 1*

A mixture of 30 cc. (⅓ gram mole) of 2-amino-2-methyl-1-propanol, 40 cc. (⅔ gram mole) of carbon disulfide and 25 cc. of water was placed in a steel bomb of 200 cc. capacity and heated at 130° C. for a period of six hours. The semi-solid mass was removed and dissolved in caustic. Inorganic impurities were removed by filtration. Acidification of the filtrate yielded 4,4-dimethyl-2-mercapto-thiazoline, a white crystalline solid, M. P. 114°–115° C. The yield was 40 grams, 81.5% of the theoretical. Analysis: Calculated for $C_5H_9NS_2$: S, 43.4; N, 9.55. Found: S, 43.09; N, 9.42.

*Example 2*

In a steel bomb were placed 22.3 grams (¼ gram mole) of 2-amino-2-methyl-1-propanol, 38 grams (½ gram mole) of carbon disulfide and 20 grams (½ gram mole) of sodium hydroxide in 50 cc. of water. The bomb was closed and heated at 130° C. for a period of six hours. The semi-solid contents were removed and filtered. The solid was dissolved in caustic solution which was then filtered to remove insoluble by-products. Acidification of the filtrate yielded 4,4-dimethyl-2-mercapto-thiazoline, a white solid in 61% yield, M. P. 114°–115° C.

*Example 3*

A mixture of 26.7 grams (0.3 gram mole) of 2-amino-1-butanol, 45.5 grams (0.6 gram mole) of carbon disulfide, and a solution of 24.0 grams of sodium hydroxide in 50 cc. of water was heated in a steel bomb at 130° C. for six hours. The cool reaction mixture was filtered and the solid residue taken up in hot benzene. Inorganic material was removed from the benzene solution by filtration. The clear solution was cooled and diluted with bus naphtha. The crystalline product was collected on a filter and air dried. The yield of 4-ethyl-2-mercapto-thiazoline was .35 grams, 80% of the theoretical, M. P. 50°–52° C. Analysis: Calculated for $C_5H_9NS_2$: S, 43.54. Found: S, 43.37, 43.12.

*Example 4*

In a steel bomb were placed 22 grams (0.3 gram mole) of 2-amino-1-propanol, 45.5 grams (0.6 gram mole) of carbon disulfide, and a solution of 24 grams (0.6 gram mole) of sodium hydroxide in 50 cc. of water. The bomb was sealed and heated at 130° C. for six hours. It was cooled and opened and the contents filtered. The solid product was washed on the filter with water and dissolved in boiling benzene. Material insoluble in benzene was separated by filtration. The benzene solution was cooled in an ice bath and diluted with bus naphtha. The yield of 4-methyl-2-mercapto-thiazoline was 25 grams, 62% of the theoretical, melting at 92.5°–93.5° C. Analysis: Calculated for $C_4H_7NS_2$: S, 48.12. Found: S, 48.22, 48.43.

Example 5

A mixture of 30 cc. (0.3 gram mole) of 2-amino-2-methyl-1-butanol, 40 cc. (0.66 gram mole) of carbon disulfide and 20 grams (½ gram mole) of sodium hydroxide in 25 cc. of water was placed in a steel bomb and heated at 130° C. for a period of 8 hours. The semi-solid mass was removed and filtered to remove insoluble inorganic by-products. The filtrate was extracted with ether and dried over anhydrous sodium sulfate. The ether was removed and the residual oil recovered. The yield of 4-methyl-4-ethyl-2-mercapto-thiazoline was 68.2%. Analysis: Calculated for $C_6H_{11}NS_2$: S, 39.75; N, 8.69. Found: S, 39.42; N, 8.52.

Example 6

Into a pressure vessel were charged 30 cc. of 2-amino-1-pentanol, 40 cc. of carbon disulfide, and 10 cc. of water. The vessel was closed and heated for 6 hours at 130° C. The product was removed from the pressure vessel, extracted with ether, and recovered by removal of the ether. An 80.8% yield of 4-propyl-2-mercapto-thiazoline melting at 44° C. was obtained. Analysis: Calculated for $C_6H_{11}NS_2$: S, 39.9%. Found: S, 39.75%.

Example 7

The process of Example 6 was repeated except that 25 cc. of ethanol was used as the solvent in place of the water. A 64% yield of 4-propyl-2-mercapto-thiazoline was obtained.

Example 8

Into a 200 cc. bomb were charged 30 cc. of 2-amino-2-methyl-1-propanol and 40 cc. of carbon disulfide. The bomb was heated for 8 hours at 130° C., then cooled and opened. The product was purified by dissolving in alkali and precipitating with acid. A 46% yield of 4,4-dimethyl-2-mercapto-thiazoline was produced. Calculated for $C_5H_9NS_2$: N, 9.55%. Found: N, 9.53%.

Example 9

The process of Example 8 was repeated using 50 cc. of benzene as a solvent. The product was purified by crystallization from benzene. A 75% yield of 4,4-dimethyl-2-mercapto-thiazoline was obtained, the product melting at 114–115° C.

Example 10

One gram mole of 3-amino-3-methyl-2-butanol, 2 gram moles of carbon disulfide, 10 gram moles of water, and 1 gram mole of sodium hydroxide were loaded into a pressure vessel and heated for 6 hours at 150° C. The product was purified by dissolving in sodium hydroxide solution and precipitating by acidifying with sulfuric acid. A 65% yield of 4,4-dimethyl-5-methyl-2-mercapto-thiazoline was obtained.

Example 11

One gram mole of 1-amino-2-methyl-propanol-2 was mixed with 2 gram moles of carbon disulfide and 15 gram moles of water in a bomb. The bomb was heated for 8 hours at 140° C. White crystals of 5,5-dimethyl-2-mercapto-thiazoline were obtained in 73% yield.

Example 12

One gram mole of 2-amino-2-methyl-1,3-propanediol was mixed with 2 gram moles of carbon disulfide, 1 gram mole of potassium hydroxide, and 15 gram moles of water in a pressure vessel. The vessel was heated to 170° C. for 6 hours. A 46% yield of 4-methyl-4-hydroxy-methyl-2-mercapto-thiazoline was obtained.

Example 13

Into a bomb were placed 30 cc. of 2-amino-2-methyl-1-propanol, 40 cc. of carbon disulfide, and 25 cc. of water. The bomb was heated at 100° C. for 6 hours. The product was purified by dissolving in alkali and precipitating with acid. A 52% yield of 4,4-dimethyl-2-mercapto-oxazoline was obtained. This was a white crystalline compound melting at 121°–122° C. The analysis was as follows:

| | Calculated for oxazoline | Found |
|---|---|---|
| | Percent | Percent |
| N | 10.58 | 10.42 |
| S | 24.4 | 26.75 |

It will be understood that the foregoing examples are given for illustrative purposes only and that our invention is not limited thereto. Many variations and modifications in the ingredients, their proportions, the temperatures and other conditions will be apparent to those skilled in the art. For example, other amino alcohols may be employed in place of those given in the examples, and some of such other amino alcohols are:

2-amino-2-ethyl-1,3-propanediol

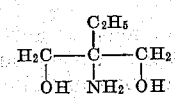

2-amino-3-hexanol

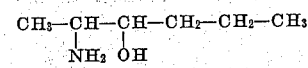

3-amino-2-methyl-4-heptanol

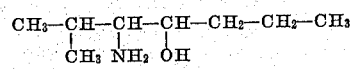

2-amino-2-methyl-3-hexanol

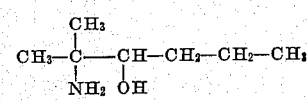

2-amino-2-propyl-1,3-propanediol

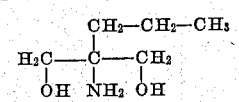

3-amino-4-heptanol

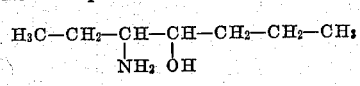

2-amino-2-isopropyl-1,3-propanediol

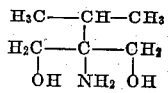

3-amino-3-methyl-4-heptanol

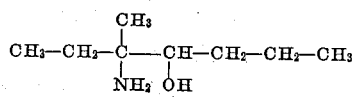

3-amino-3-methyl-2-pentanol

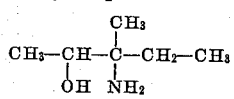

5-amino-4-octanol

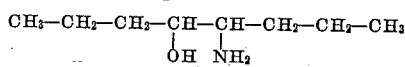

2-amino-1-pentanol

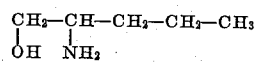

We have found that the 2-mercapto-thiazolines, produced in accordance with our invention, are excellent accelerators for the vulcanization of rubber, giving very high moduli and tensiles and good ageing. Derivatives of these compounds, in which the mercapto hydrogen is replaced by various groups as benzoyl, acetyl, dinitrophenyl and the like, are also excellent accelerators. These compounds disperse readily in rubber, are odorless and impart no odor or discoloration to the vulcanized rubber.

We claim:

1. The method of making a 2-mercapto-thiazoline which comprises reacting carbon disulfide with an ortho-monoamino aliphatic alcohol of at least 3 carbon atoms which is otherwise free of strongly acidic, strongly basic and aromatic substituents in a closed vessel at temperatures above 120° C.

2. The method of making a 2-mercapto-thiazoline which comprises reacting carbon disulfide with an ortho-monoamino alkanol of at least 3 carbon atoms in a closed vessel at temperatures above 120° C.

3. The method of making a 2-mercapto-thiazoline which comprises heating substantially 2 to about 3 moles of carbon disulfide with substantially 1 mole of an ortho-monoamino aliphatic alcohol of at least 3 carbon atoms which is otherwise free of strongly acidic, strongly basic and aromatic substituents under superatmospheric pressures at temperatures above 120° C.

4. The method of making a 2-mercapto-thiazoline which comprises heating substantially 2 to about 3 moles of carbon disulfide with substantially 1 mole of an ortho-monoamino alkanol of from 3 to 8 carbon atoms under superatmospheric pressures at temperatures of from substantially 130° C. to about 170° C. in an inert solvent.

5. The method of making a 2-mercapto-thiazoline which comprises heating substantially 2 to about 3 moles of carbon disulfide with substantially 1 mole of 2-amino-1-propanol under superatmospheric pressures at temperatures of from substantially 130° C. to 170° C. in an inert solvent.

6. The method of making a 2-mercapto-thiazoline which comprises heating substantially 2 to about 3 moles of carbon disulfide with substantially 1 mole of 2-amino-2-methyl-1-propanol under superatmospheric pressures at temperatures of from substantially 130° C. to about 170° C. in an inert solvent.

7. The method of making a 2-mercapto-thiazoline which comprises heating substantially 2 to about 3 moles of carbon disulfide with substantially 1 mole of an ortho-monoamino aliphatic alcohol of at least 3 carbon atoms which is otherwise free of strongly acidic, strongly basic and aromatic substituents under superatmospheric pressures at temperatures of from substantially 130° C. to substantially 170° C. in a hydroxylated solvent.

8. The method of making a 2-mercapto-thiazoline which comprises heating about 2 to about 3 moles of carbon disulfide with about 1 mole of an ortho-monoamino alkanol of from 3 to 8 carbon atoms under superatmospheric pressures at temperatures of from about 130° C. to about 170° C. in water solution.

9. The method of making a 2-mercapto-thiazoline which comprises heating substantially 2 to about 3 moles of carbon disulfide with substantially 1 mole of an ortho-monoamino alkanol of at least 3 carbon atoms under superatmospheric pressures at temperatures of from substantially 130° C. to about 170° C. in water solution and in the presence of caustic alkali.

BERNARD M. STURGIS.
JOHN J. VERBANC.